United States Patent [19]

Brandt

[11] Patent Number: 5,153,781
[45] Date of Patent: Oct. 6, 1992

[54] REAR VIEW MIRROR ASSEMBLY FOR MOTOR VEHICLES AND THE LIKE

[76] Inventor: Dale E. Brandt, W55 N186 Woodmere, Cedarburg, Wis. 53012

[21] Appl. No.: 436,981

[22] Filed: Oct. 19, 1989

Related U.S. Application Data

[63] Continuation-in-part of Ser. No. 320,507, Mar. 8, 1989, abandoned.

[51] Int. Cl.[5] .................................................. G02B 7/18
[52] U.S. Cl. ...................................... 359/865; 359/866
[58] Field of Search ............... 350/615, 616, 626, 627; 248/476, 481, 479

[56] References Cited

U.S. PATENT DOCUMENTS

| | | | |
|---|---|---|---|
| 2,320,904 | 6/1943 | Bachkai | 350/627 |
| 2,582,651 | 1/1952 | Peterson | 350/627 |
| 2,802,394 | 8/1957 | Krone | 350/627 |
| 3,145,257 | 8/1964 | Suga | 350/627 |
| 4,643,544 | 2/1987 | Loughran | 350/627 |
| 4,832,476 | 5/1989 | Gabrielyan | 350/626 |

*Primary Examiner*—Bruce Y. Arnold
*Assistant Examiner*—James Phan

[57] ABSTRACT

A rear view mirror for mounting to the windshield of a motor vehicle, comprising a flexible, molded frame having mounted therein a first mirror panel adapted to provide a view to the immediate rear of the vehicle, and an angularly adjustable second mirror panel adapted to provide an independent view to the rear, right side of the vehicle. The frame is formed with a vertically extending web separating the mirror panels from one another and defining a pivot axis for accomodating relative angular movement between the mirror panels. The mirror panels are adapted to be adjusted angularly with respect to one another within prescribed design limits whereby to provide the particular view angles desired to the rear and to the right side of the vehicle through means of an adjustable length arm mechanism which is connected to and between the frame sections to either side of the aforesaid web. The frame sections are further hingedely joined by means of a spring steel metal strap incorporated into the frame in a position to normally bias the mirror panels to a position of alignment with one another, said strap serving to maintain the mirror panels and arm mechanism in a vibration-free, fixed position of adjustment during vehicle operation.

5 Claims, 1 Drawing Sheet

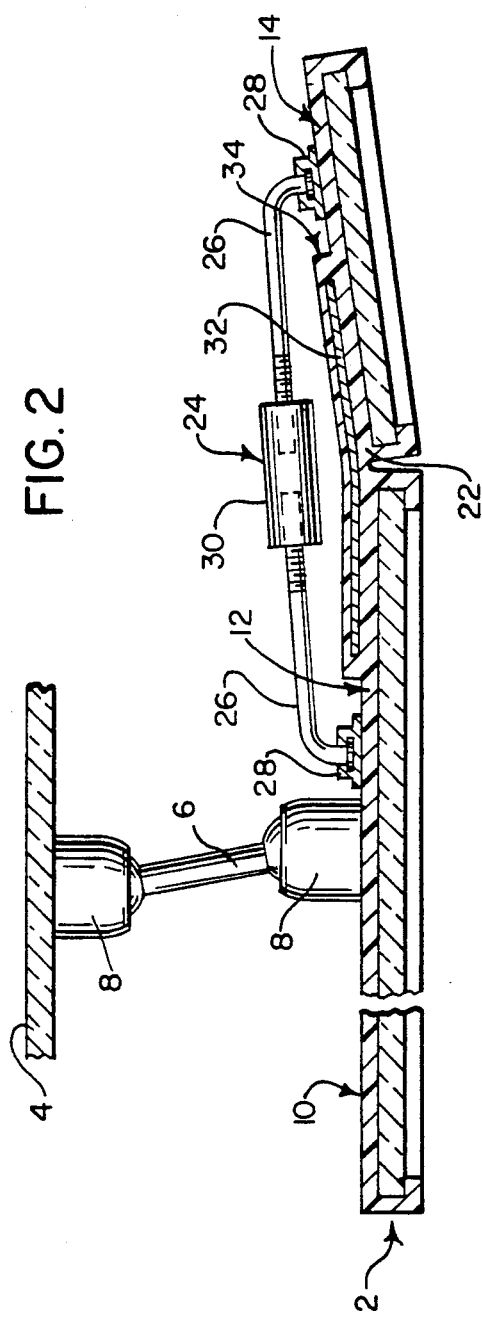
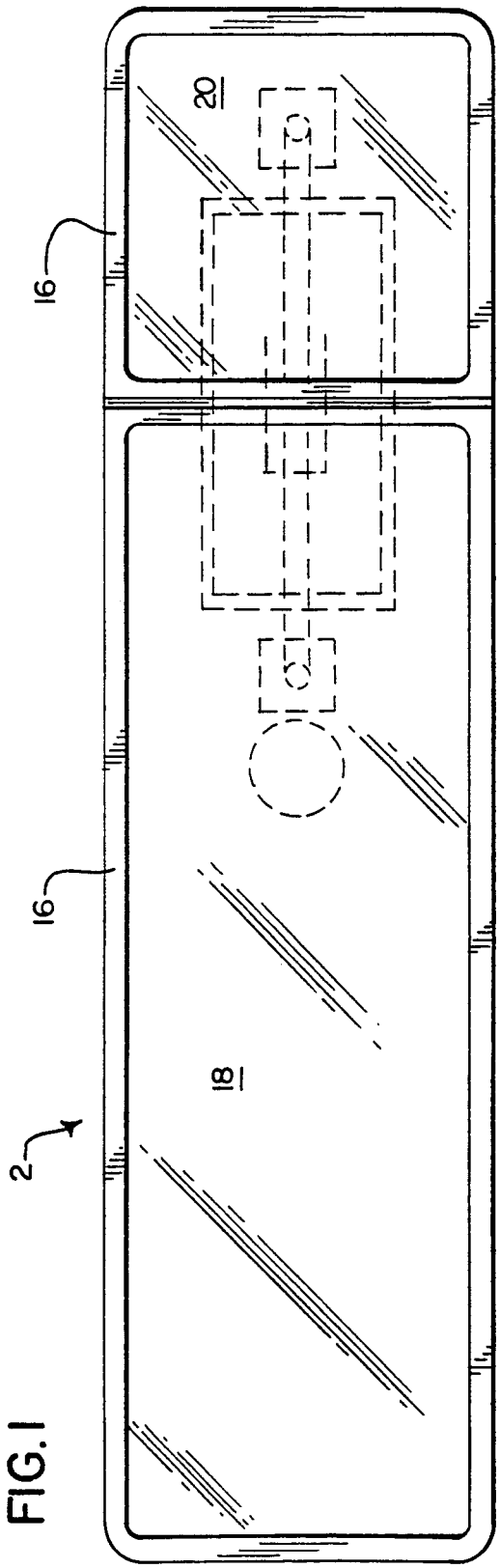

REAR VIEW MIRROR ASSEMBLY FOR MOTOR VEHICLES AND THE LIKE

This application is a continuation-in-part of patent application Ser. No. 320,507, filed Mar. 8, 1989, entitled "Rear View Mirror Assembly For Motor Vehicles", and having the same inventor as that of the present application. The aforesaid application Ser. No. 320,507 has been abandoned in favor of the instant application.

This invention relates to a rear view mirror for motor vehicles and the like and more particularly is directed to a rear view mirror adapted to be mounted to the windshield of a vehicle and having an angularly adjustable right-hand wing portion serving to provide a view of the roadway to the rear, right side of the vehicle.

In driving on today's expressways and multiple lane surface roads and highways, there is a frequent need to change traffic lanes as, for example, in entering upon or exiting from an expressway or surface road, in passing slower moving vehicles, in returning to a lane after passing, etc. In preparation for these lane changes, the vehicle operator must, of course, carefully visually check the traffic conditions to the rear and side of the vehicle to insure that the lane change can be accomplished without interference from following traffic to the sides of the subject vehicle. The traditional windshield mounted, rear view mirror is known to contain blind spots both to the rear, left side and the rear, right side of the vehicle and thus the views presented by such mirrors cannot be relied upon by the driver for complete safety in making lane changes. Also, the side mounted, rear view mirrors commonly employed with most modern day vehicles have not eliminated the problem of these blind spots and thus such mirrors while affording the vehicle driver another perspective of the traffic patterns to the sides of the vehicle cannot be relied upon for complete safety in making lane changes. Then too in the case of the right side of the vehicle, the driver's view angle is quite limited and in order to provide a meaningful view to this side with a side mounted mirror, it becomes necessary to utilize a mirror surface of convex surface curvature. This results in a distortion both in size and distance of following vehicles to this side of the vehicle, making it extremely difficult to accurately judge the precise position of such vehicles.

Owing to these limitations of conventional rear view mirrors, a prudent driver will normally glance backward over his or her shoulder prior to making a lane change to obtain a direct, albeit limited, view of the traffic lane into which the vehicle is to be turned. While this over-the-shoulder view is a recommended maneuver or safety step, a measure of driving safety is necessarily sacrificed thereby due to the momentary diversion of the driver's attention from the roadway to the immediate front of the vehicle. This backward glance is particularly risky under the high speed, congested traffic conditions prevailing on many of today's expressways and surface roads.

A further drawback of the over-the-shoulder glance is that in the case of the right side of the vehicle, the operator's view may be obstructed, in whole or in part, either by passengers and/or by other objects which may be present in the rear seat. Under such conditions, it is virtually impossible for the driver to obtain a full view of the roadway to the right side of the vehicle and there thus is created an unsafe driving condition insofar as right lane changes are concerned. This problem is not as acute in the case of a lane change to the left side of the vehicle since the view angle to this side is more favorable and the problem of passengers or other objects obstructing the view is not as severe.

Various efforts have been made from time to time to develop a rear view mirror capable of providing an improved, substantially broadened view to the rear and sides of a vehicle: see, for example, U.S. Pat. Nos. 4,695,138 to Epstein; 4,643,544 to Loughran; 4,019,812 to Carnine; 3,021,756 to Milton et al; and 2,649,028 to Lenta.

As shown in these and other such prior art patents, the mirror is constructed of the combination with a center panel section adapted to provide the usual view directly to the rear of the vehicle, of first and second wing-like extensions pivotably connected to the opposite edges of the center section so as to provide separate, independent views to the rear and each side of the vehicle. While eliminating the blinds spots of the conventional mirror to the sides of the vehicle, these modified types of mirrors present the vehicle operator with as many as three separate and distinct views at once of the roadway and traffic conditions to the rear of the vehicle and there is the very real danger that the operator may become confused or bewildered at times as to which view he or she is observing at any particular instant. Even momentary confusion can place the vehicle and its occupants in jeopardy, given the matter of the extremely short time period, perhaps a few tenths of a second, the driver may have to make a decision as to whether to change traffic lanes or wait for traffic to clear before making a change. Such confusion is particularly apt to occur under high speed, congested traffic conditions and/or among drivers who are relatively inexperienced or unfamiliar with the use of such a three view in one mirror.

A further drawback of these multi-faceted rear view mirrors is that there is no quick and reliable means for adjusting the angularity of the side wing sections relatively of the center section in order to provide for any particular driver or vehicle operator the desired optimum view angles to the sides of the vehicle. Normally also there are no limits to the possible range of movement of these wing sections and thus it is not an easy matter for the vehicle operator or driver to quickly attain the desired setting for the wing extensions and driving safety may suffer as a result of the driver's attention being diverted from the roadway to attend to these adjustments. Further detracting from the desirability of prior art mirror devices of this type is that in the typical such design there is no means for maintaining the wing sections in a locked or fixed position of angularity to the center section such that accidental or inadvertent contact with the extensions may necessitate a re-adjustment of the same.

Moreover, a number of these multi-view mirror designs employ hinge type elements or other like connector elements requiring relatively close tolerances for joining the wing extensions to the center mirror section and this not only detracts from the operational reliability of the mirror but also adds significantly to the cost of manufacture.

The aforementioned shortcomings of these modified forms of rear view mirrors have curtailed the use of the same either as original equipment or as accessories in the automotive after sale market despite the acknowledged potential of such devices for enhancing safety of operation under today's high speed, high density traffic conditions on expressways and multiple lane surface roads.

It is an object of the present invention to provide a rear view mirror assembly for a vehicle which provides the vehicle operator with one view of the traffic directly to the rear of the vehicle and a second, separate and distinct view of the traffic to the rear, right side of the vehicle whereby to enable lane changes to be made to the right side of the vehicle with safety and without the necessity of the driver glancing backward over his or her shoulder for a direct view of the roadway to the side of the vehicle.

A further object of the invention is the provision of a rear view mirror assembly for motor vehicles which presents the vehicle driver with but two separate and distinct views of the roadway to the rear of the vehicle and which is relatively inexpensive of construction, reliable and accurate of operation, and readily adaptible of use either as original equipment or as an accessory with today's designs of motor vehicles.

Another object of the invention is the provision of a two view in one mirror which is capable of being accurately and quickly adjusted by the vehicle operator to provide the operator with the exact or optimum view angle desired to the rear and side of the vehicle.

A still further object of the invention is the provision of a rear view mirror for a motor vehicle having an angularly adjustable end section for viewing to the rear, right side of the vehicle and incorporating a self-locking adjustment means for varying the angularity of said end section within prescribed design or safety limits.

Generally, in the present invention, a flexible frame or casing has mounted therein a main mirror for viewing to the immediate rear of a vehicle and a pivotably mounted wing mirror for viewing to the rear, right side of the vehicle. The frame includes a vertical web separating the mirrors and the corresponding views of the roadway presented thereby from one another. Associated with the frame is an adjustable length arm mechanism for controlling the relative angularity between the mirrors within fixed or prescribed limits whereby to enable the vehicle operator to obtain the exact view angle desired to the right side of the vehicle. The proposed mirror further includes a hinge plate of spring steel normally biasing the mirrors to a position of alignment with one another and operative to maintain the mirrors in a vibration-free, fixed position of angularity relative to one another during vehicle operation.

In the proposed mirror, the vehicle driver is presented with but two independent views of the roadway to the rear of the vehicle and, as compared with the three view in one type prior art mirrors, there is a consequent reduced risk in the invention of the driver confusing the views with which he or she is confronted at any particular time. At the same time with the proposed design, the driver can readily observe the traffic lanes to the right side of the vehicle and can engage in right lane changes with safety and without the necessity of obtaining a direct view of the right lane and thereby diverting his or her attention from the traffic to the immediate front of the vehicle. The proposed mirror provides this increased driving safety in a design which is relatively inexpensive of manufacture, reliable of operation and simple and accurate in use.

Other objects and advantages of the invention will become apparent in the course of the following description of a presently preferred embodiment of the invention when taken in conjunction with the accompanying drawings.

In the drawings:

FIG. 1 is an elevation from the front of the mirror of the invention with certain parts shown in phantom lines; and FIG. 2 is a sectional view of the mirror taken along the lines 2—2 of FIG. 1.

Referring first to the embodiment of the invention shown in FIGS. 1 and 2 of the drawings, a rear view mirror assembly incorporating the novel concepts of the disclosure and indicated as a whole in the drawings by the reference numeral 2 is adapted to be mounted to a vehicular windshield 4 by means of a mounting post 6 and a pair of conventional ball-and-socket joints 8 serving to permit the assembly 2 to be adjusted universally on the post and relatively of the windshield to provide the vehicle operator with the desired view angle to the rear of the vehicle.

Mirror assembly 2 comprises a generally rectangular casing or frame 10 formed of a relatively light-weight, flexible material such as plastic and having an elongated main frame section 12 and a relatively narrow, right-hand wing section or extension 14. Frame sections 12 and 14 are each formed with continuous edges or bead-like formations 16 defining U-like grooves in the sections 12 and 14 for the receipt of a pair of mirror panels 18 and 20 respectively, the latter being retained in place in the frame by a snap fit within such grooves.

Mirror 18 is designed for viewing directly to the rear of the vehicle and is of a flat surface construction so as to provide for an undistorted perspective view of the roadway and traffic to the immediate rear of the vehicle while mirror 20 is designed for viewing to the rear, right side of the vehicle so as to avoid the traditional blind spot of mirror panel 18 to the right side of the vehicle. Mirror panel 20 is also of a flat surface construction so as to not distort the view to the rear as to size and distance of objects as is commonplace with conventional side mounted rear view mirrors utilizing mirror surfaces of convex curvature. Frame 10 has a relatively wide, vertically extending rib or web 22 separating the frame sections 12 and 14 and the corresponding mirror panels 18 and 20 such that the two separate views of traffic being presented to the vehicle operator at any given instant by the mirror assembly as a whole are at all times maintained separate and distinct one from the other so as to reduce the risk of the operator confusing the views and making an unsafe driving decision or maneuver. The line of demarcation between the separate views is further amplified by the presence of the edges or beads 16 to either side of the web or rib 22.

Web 22 serves further as a vertical hinge or pivot axis for accomodating relative pivot movement between frame sections 12 and 14 and between the corresponding mirror panels 18 and 20. Such pivot movement serves to allow the angle of view being presented to the vehicle operator of the roadway to the rear, right-side of the vehicle to be adjusted as desired by the operator to meet his or her particular viewing requirements.

The angularity of mirror panel 20 to the main mirror panel 18 is adapted to be controlled through means of an adjustable length linkage or arm mechanism 24 carried on the forward most side of the frame 10, as the latter is viewed from the driver's position in the vehicle. Mechanism 24 is comprised of a pair of like pins 26 secured to the frame between the sections 12 and 14 in opposed relation to one another by lugs 28 molded of plastic and secured in place by a suitable cement or bonding agent. The free ends of pins 26 are threaded and are joined to one another through a threaded coupling nut or sleeve 30, the latter being threadably internally and having both left and right hand threads whereby to provide a double threading action with the opposed pins 26 as the coupler sleeve 30 is turned either in a clockwise or counterclockwise direction. As will be apparent, the sleeve or coupler in being thus turned will cause the pins 26 to be drawn together or forced apart to cause a corresponding angular movement between the separate frame sections 12 and 14 and the corresponding mirror panels 18 and 20. The range of angular movement permitted between the frame sections 12 and 14 and the corresponding mirror panels 18 and 20 by the arm mechanism 24 is restricted so as to prevent movement of the mirror panel 20 beyond designed safety limits. As a result of this, any adjustments which may be required in the angle of mirror panel 20 ordinarily may be carried out quite rapidly and with a minimum of wasted effort on the part of the vehicle driver. This, of course, is essential in situations where the driver, for one reason or another, finds it necessary to adjust the view angle to the right side of the vehicle while the latter is in traffic.

The lugs 28 have sufficient intrinsic flexibility to permit the pins 26 to maintain alignment with one another as frame sections 12 and 14 move or pivot with respect to one another about the pivot or hinge axis defined by web 22. As a result of this, coupler or sleeve 30 will not bind on pins 26. The range of adjustment required in the angle between the frame sections and mirror surfaces is quite small also and thus only a limited flexing of the lugs 28 is required to enable the pins to maintain alignment as the coupler is turned or adjusted.

The improved mirror assembly of the invention further comprises a relatively thin hinge plate 32 of spring steel or other relatively stiff, yet resilient metal extending between and connecting the frame sections 12 and 14. Plate 32 acts to yieldingly oppose angular or pivot movement between the frame sections 12 and 14 such that in the use of the mirror assembly 2 with the wing-like extension 14 at an angle to the main frame section 12 a positive force will be exerted continuously against the sections 12 and 14 and against the opposed portions of the adjustment arm or linkage 24. As a result, the frame sections 12 and 14 and corresponding mirror panels 18 and 20 will be held securely in the position of adjustment established by the vehicle operator during vehicle operation while at the same time the frame sections, mirror panels and the arm mechanism are secured against vibration. Plate 32 thus has a dual function, serving as a hinge type connector between the frame sections 12 and 14 whereby to reinforce and supplement the action of the aforesaid web 22, as well as serving as a tensioning member for the various components of the mirror assembly. Preferably, plate 32 is molded in place in the frame during fabrication of the same, the frame being provided with a thickened wall portion in the area of the plate as indicated at 34 in the drawings.

The mirror assembly as thus set forth affords the vehicle driver with but two separate, independent views of the roadway to the rear of the vehicle. As a result of this, the risk of the driver becoming confused as to which view is of the traffic to the immediate rear of the vehicle and which is to the side is greatly reduced. Also, as previously noted, the casing beads or edges 16 on the adjacent vertical sides of the frame sections 12 and 14, combined with the intermediate web 22 provide a wide, opaque zone of demarcation between the two views of traffic being presented to the vehicle operator at any one time and the driver will normally have little difficulty in separating the two views of traffic from one another.

With the proposed mirror, the necessity of the driver diverting his or her attention from the road immediately to the front of the vehicle to acquire a direct view of the right-hand traffic lanes is obviated and overall driving safety is thereby enhanced. The vehicle operator must rely upon the conventional side mounted mirror and a direct over the shoulder glance to the rear, left side of the vehicle in making a traffic lane change to the left of the vehicle but inasmuch as this view is far more attainable and accurate than the comparable view to the right there is little if any sacrifice in driving safety due to the lack or absence of a left-hand pivotable mirror section in the overall assembly.

The incorporation into the two-way mirror of the invention of a ready, accurate means for adjusting the view angle of the driver to the vehicle's side and rear coupled with the relatively simple overall construction of the mirror with its lack of dependence upon costly hinges or pivot pin arrangements for accomodating angular movement of the mirror end section adds greatly to the mirror's overall utility and commercial attractiveness in the automotive field.

While described in connection with a motor vehicle, the novel mirror assembly of the invention is capable of use as well with other forms and types of transportation devices, i.e. trucks, airplanes, etc., and may also be adapted for use in a wide variety of other instances not tied to vehicles or like transportation devices.

It is to be noted also that the mirror of the invention may be utilized with equal effectiveness with vehicles of the type in which the steering wheel and hence the driver are located on the right-hand side of the passenger compartment rather than on the left-hand side. This is the case with most European vehicles. In these cases, the pivotable end section of the mirror would be located to the left of the main mirror panel rather than to the right as previously described and the adjusting mechanism would necessarily therefore be shifted to the left-hand portion of the mirror.

Various modes of carrying out the invention are contemplated as being within the scope of the following claims particularly pointing out and distinctly claiming the subject-matter regarded as the nature of the invention.

I claim:

1. A rear view mirror assembly for mounting to the windshield of a vehicle, comprising a frame, a pair of separate mirror panels set in said frame in side-by-side relation, said frame having an opaque, vertically extending rib separating said mirror panels from one another and defining a vertical pivot axis for permitting said panels to move angularly with respect to one another, an arm mechanism connected to said frame for controlling the angular position of said mirror panels with respect to one another, said arm mechanism including opposed pin means connected at one end to opposed portions of said frame and threadably connected to one another at their opposed free ends by a coupling sleeve to permit infinite adjustment in the length of said arm mechanism within prescribed limits, and a metal strap of resiliently flexible material connected to and between said frame portions for maintaining the arm mechanism and said opposed frame portions under tension to damp out road and vehicle vibrations and maintain the separate mirror panels in a fixed position of angularity with respect to one another during vehicle operation.

2. The mirror assembly of claim 1 wherein said pair of mirror panels are of a flat surface construction so as to provide undistorted views of the roadway to the rear of the vehicle.

3. A mirror assembly for mounting to a vehicular windshield to provide first and second views only to the rear of the vehicle, one of said views being directly to the rear of the vehicle and the other being to the rear and far side of the vehicle relative to the position of the vehicle operator, said assembly comprising a generally rectangular frame having a main frame section and a wing-like end section, first and second mirrors set in said main frame section and said end section, respectively, said frame sections separated by an opaque, vertical web member defining a vertical hinge axis about which said frame sections are free to pivot relative to one another, an arm mechanism connected to and between said separate frame sections for manually adjusting the angular position of said frame sections with respect to one another, said arm mechanism having fixed limits of adjustment and including threaded means for permitting an infinitely variable adjustment in the angularity of said frame sections with respect to one another within the limits set by said arm mechanism, and a backing plate means of a resiliently flexible material extending between and connected to said frame sections for continuously urging said frame sections to a position of longitudinal alignment with one another, said backing plate means opposing angular movement of the frame sections relative to one another and cooperating with said arm mechanism to fixedly secure said frame sections and said mirrors in a given position of angularity with respect to one another.

4. The mirror assembly of claim 3 wherein said backing plate means is in the form of a thin metal strap embedded in said frame between the separate frame sections, said backing plate means serving also to hingedly connect said frame sections to one another.

5. A mirror having two fields of view for mounting to a vehicle windshield, comprising a generally rectangular mirror panel for viewing directly to the rear of the vehicle and having one end portion only pivotably movable about a vertical axis to provide a second view to the rear and side of the vehicle, an arm mechanism of adjustable length connected to said pivotably movable end portion for controlling the pivot position of said end portion to the mirror panel as a whole, said mechanism limiting the angular adjustment of said end portion between fixed limits and having a threaded adjusting member permitting an infinite range of adjustment of said movable end portion between said fixed limits, and a resiliently flexible plate-like member hingedly connecting the pivotable end portion of the mirror panel to the panel proper and yieldingly biasing the pivotable end portion of the mirror panel and the mirror panel proper to a position of alignment with one another, said plate-like member serving to maintain said end portion of the mirror in the position of angularity established by said arm mechanism and also serving to maintain said mirror in a vibration-free condition during vehicle operation.

* * * * *